US012592885B2

(12) United States Patent
Pothula et al.

(10) Patent No.: US 12,592,885 B2
(45) Date of Patent: Mar. 31, 2026

(54) REDUCED OUTAGE TIME WITH IMPROVED DOWNLOAD TO HARDWARE TABLES BASED ON DIFFERENT ENTRIES

(71) Applicant: Arista Networks, Inc., Santa Clara, CA (US)

(72) Inventors: Lakshmikantha Chowdary Pothula, Santa Clara, CA (US); Purushothaman Nandakumaran, Milpitas, CA (US); Swaroop George, Bangalore (IN); Ravil Baizhiyenov, Burnaby (CA); Jiacheng Guo, Burnaby (CA); Zhong Xu, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 614 days.

(21) Appl. No.: 17/963,498

(22) Filed: Oct. 11, 2022

(65) Prior Publication Data

US 2024/0121188 A1      Apr. 11, 2024

(51) Int. Cl.
H04L 45/7452      (2022.01)
H04L 9/40      (2022.01)
H04L 43/028      (2022.01)
(52) U.S. Cl.
CPC ........ H04L 45/7452 (2022.05); H04L 43/028 (2013.01); H04L 63/101 (2013.01)
(58) Field of Classification Search
CPC .. H04L 45/7452; H04L 43/028; H04L 63/101
USPC ........................................................ 370/392
See application file for complete search history.

(56) References Cited

U.S. PATENT DOCUMENTS

| | | | |
|---|---|---|---|
| 8,391,289 | B1 | 3/2013 | Yalagandula et al. |
| 9,906,443 | B1 * | 2/2018 | Singh .................. H04L 49/3063 |
| 10,228,852 | B1 * | 3/2019 | Volpe .................... G06F 3/0631 |
| 2009/0052445 | A1 | 2/2009 | Folkes |
| 2015/0149658 | A1 | 5/2015 | Wei |
| 2016/0072696 | A1 | 3/2016 | He et al. |
| 2016/0308767 | A1 | 10/2016 | Borgione et al. |
| 2016/0352613 | A1 | 12/2016 | Narayanan et al. |
| 2019/0005148 | A1 | 1/2019 | Lam et al. |
| 2020/0153682 | A1 | 5/2020 | Nidumolu et al. |
| 2020/0374230 | A1 | 11/2020 | Aibester et al. |
| 2024/0121151 | A1 | 4/2024 | Pothula et al. |

OTHER PUBLICATIONS

European Patent Office, Extended European Search Report, EP App. No. 23202604.7 dated Feb. 2, 2024, 17 pgs.

* cited by examiner

*Primary Examiner* — Hermon Asres
(74) *Attorney, Agent, or Firm* — Fountainhead Law Group, PC

(57)      ABSTRACT

Software tables in the control plane of a network device are downloaded into the data plane hardware after a reboot of the control plane. Valid entries are identified and downloaded while reducing the downloading invalid or otherwise unused entries to improve download times and reduce disruption of traffic resulting from the download. In some instances, blocks of entries containing a high ratio of valid to invalid entries are identified and downloaded to the hardware. In some instances, entries in the software tables that differ from corresponding entries in the hardware (diff entries) are identified and downloaded. In some instances, chunks containing diff entries and non-diff entries are identified and downloaded.

20 Claims, 11 Drawing Sheets network device, 300 network device, 300 network device, 300 network device, 300 recompute data tables, 402

(optional) skip small software tables, 404 catalogue software tables for downloading select usage ratio, 406 identify blocks in each software table, 408 coalesce adjacent blocks, 410 quiesce data plane, 412 download catalogued tables, 414 re-enable traffic processing in data plane, 416 recompute software tables, 902 access corresponding hardware tables, 904 identify different entries (diff entries), 906 quiesce data plane, 908 download diff entries, 910 re-enable traffic processing in data plane, 912

REDUCED OUTAGE TIME WITH IMPROVED DOWNLOAD TO HARDWARE TABLES BASED ON DIFFERENT ENTRIES

CROSS REFERENCE TO RELATED APPLICATIONS

This application is related to commonly-owned U.S. Pat. No. 12,452,130, issued Oct. 21, 2025, the content of which is incorporated herein by reference in its entirety for all purposes.

BACKGROUND

The present disclosure relates to software upgrades in a network device, and in particular to reducing traffic outage when upgrading software in the control plane of the network device. With some upgrades, various software tables in the control plane may be recomputed or relearned. For example, lookup tables such as TCAM (ternary content-addressable memory), hash tables, and the like can change if the upgrade involves new policies where policy rules are deleted, added, or reprioritized in the policy. Changes in the lookup tables may affect various direct index tables, which are data tables that are pointed to by the rules (referred to as filters) in the lookup tables. The data plane can continue to process and forward network traffic while the control plane is being updated. However, when the control plane reboots, information in the software tables is downloaded to corresponding hardware tables in the data plane as part of the process. To avoid mis-forwarding of packets while the hardware tables are being reloaded, traffic in the data plane can be halted so that the software tables can be downloaded to the hardware tables. To reduce traffic outage time, the download should complete as soon as possible.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
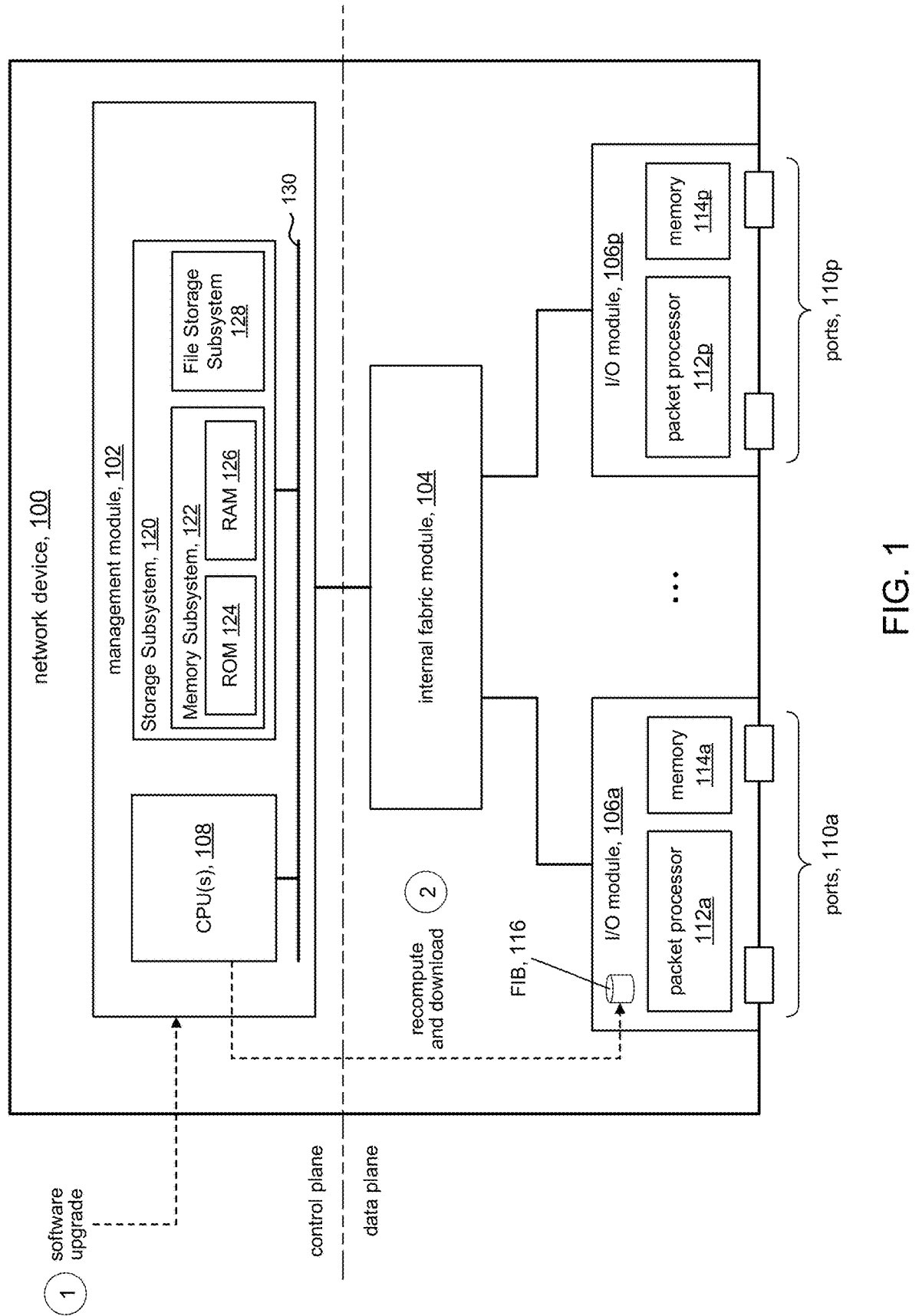
FIG. 1 represents components and aspects of a network device in accordance with the present disclosure.

FIG. 1 depicts an example of a network device 100 (e.g., switch, router, gateway, etc.) operable in accordance with some embodiments of the present disclosure. As shown, networking device 100 includes a management module 102, an internal fabric module 104, and a number of I/O modules 106a-106p. Management module 102 includes the control plane (also referred to as control layer or simply the CPU) of networking device 100 and can include one or more management CPUs 108 for managing and controlling operation of networking device 100 in accordance with the present disclosure. Each management CPU 108 can be a general-purpose processor, such as an Intel®/AMD® x86, ARM® microprocessor and the like, that operates under the control of software stored in a memory, such as ROM (read-only memory) 124 or RAM (random-access memory) 126. The control plane provides functions and processes that determine which path to use, such as routing protocols, spanning tree, and the like.

Internal fabric module 104 and I/O modules 106a-106p collectively represent the data plane of networking device 100 (also referred to as data layer, forwarding plane, etc.). Internal fabric module 104 is configured to interconnect the various other modules of networking device 100. Each I/O module 106a-106p includes one or more input/output (ingress/egress) ports 110a-110p that are used by networking device 100 to send and receive network traffic. Each I/O module 106a-106p can also include packet processing capability, logically represented by respective packet processors 112a-112p and memory components 114a-114p. Packet processors 112a-112p can comprise forwarding hardware, including for example, data processing elements such as an ASIC (application specific integrated circuit), FPGA (field programmable array), digital processing unit, and the like. Memory components 114a-114p can include lookup hardware, including for example, content addressable memory such as TCAMs (ternary CAMs) and auxiliary memory such as SRAMs (static random access memory). The forwarding hardware in conjunction with the lookup hardware can provide wire speed decisions on how to process ingress packets and outgoing packets for egress. In accordance with some embodiments of the present disclosure can be performed wholly within the data plane.

Management module 102 includes one or more management CPUs 108 that communicate with storage subsystem 120 via bus subsystem 130. Other subsystems, such as a network interface subsystem (not shown in FIG. 1), may be on bus subsystem 130. Storage subsystem 120 includes memory subsystem 122 and file/disk storage subsystem 128, which represent non-transitory computer-readable storage media that can store program code and/or data, which when executed by one or more management CPUs 108, can cause one or more management CPUs 108 to perform operations in accordance with embodiments of the present disclosure.

Memory subsystem 122 includes a number of memories including main RAM 126 for storage of instructions and data during program execution and ROM (read-only memory) 124 in which fixed instructions and data are stored. File storage subsystem 128 can provide persistent (i.e., non-volatile) storage for program and data files, and can include a magnetic hard disk drive, a solid-state drive, and/or other types of storage media known in the art.

One or more management CPUs 108 can run a network operating system stored in storage subsystem 120. A network operating system is a specialized operating system for networking device 100 (e.g., a router, switch, firewall, and the like). For example, the network operating system may be Arista Extensible Operating System (EOS®), which is a fully programmable and highly modular Linux-based network operating system. Other network operating systems may be used.

Bus subsystem 130 can provide a mechanism for communication among the various components and subsystems of management module 102. Although bus subsystem 130 is shown schematically as a single bus, alternative embodiments of the bus subsystem can utilize multiple busses.

Each I/O module (e.g., 106*a*) in network device 100 can include various data tables to facilitate forwarding traffic through the network device. These data tables can be stored in the packet processor (e.g., 112*a*) and/or in the memory (e.g., 114*a*) of the I/O module. These data tables are collectively represented in FIG. 1 as FIB (forwarding information base) 116, and can also be referred to generally as packet processing data tables. Likewise, the internal fabric module 104 can include data tables to facilitate the exchange of data between the I/O modules. Forwarding information stored in these data tables in the data plane can originate in the control plane and be downloaded into the data tables. Because of the hardware-centric nature of the data plane, data tables in the data plane can be referred to as "hardware" tables or simply "the hardware." Data tables in the control plane that store the forwarding information to be downloaded to the hardware tables can be referred to as the "software" tables.

Software in the control plane is occasionally upgraded, for example, to reconfigure routes, install additional features, and so on. Sometimes a software upgrade of the control plane can involve deleting the data state of the software tables in the control plane, including the forwarding information. In those circumstances, the control plane can recompute/relearn the forwarding information. In the meanwhile, the data plane can continue to receive and forward network traffic. In other words, the data plane can process network traffic concurrently with the software upgrade operations in the control plane. When the control plane is ready to download the recomputed forwarding information to the hardware tables in the data plane, the control plane can quiesce (pause, stop) traffic processing in the data plane for a period of time in order to download the data. Traffic can be paused on the order of several seconds depending on the amount of data to be downloaded, which in some deployments may be deemed unacceptable.

Downloading Valid (Used) Table Entries

The discussion will now turn to a description of downloading software tables based on whether the table entries are valid (used) or invalid (unused) to reduce traffic outage time.

Figure 2A:
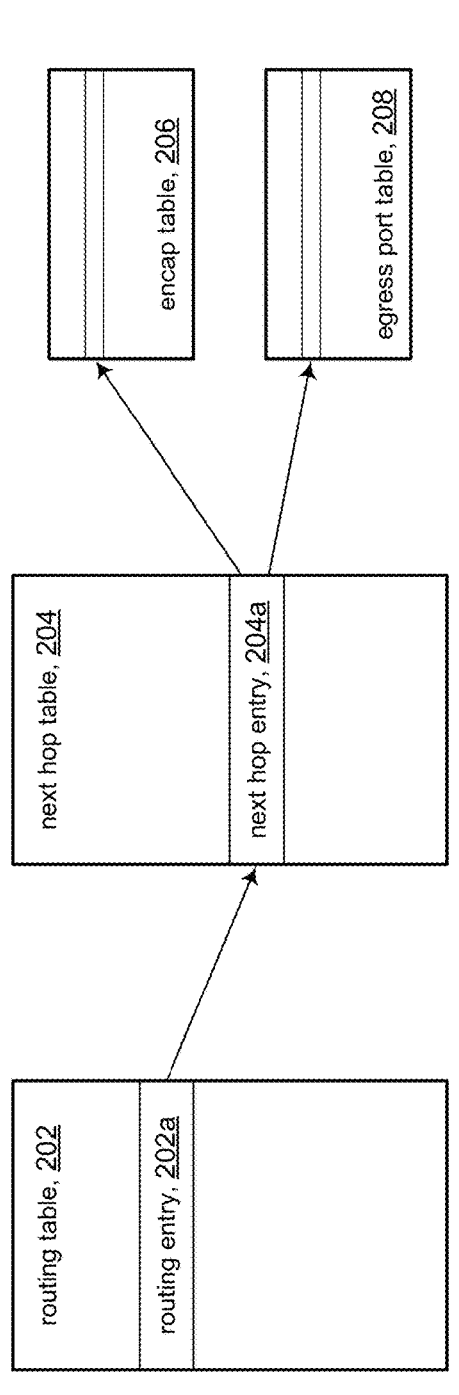
FIGS. 2A and 2B depict illustrative examples of data tables that can be processed in accordance with the present disclosure.

FIG. 2A shows schematic representations of some data tables that can comprise FIB 116 to illustrate aspects of the present disclosure. It will be appreciated that in various embodiments, FIB 116 can comprise numerous other data tables. Routing table 202, for instance, can be a lookup table to inform network device 100 how to route a packet and to where the packet is to be routed. Information in a packet (e.g., a destination IP (Internet protocol) address) can be used to look up an entry in the routing table. Each entry (e.g., routing entry 202*a*) in the routing table can include one or more indices (pointers) to other data tables. Routing entry 202*a*, for instance, includes an index into next hop table 204. Entries (e.g., next hop entry 204*a*) in the next hop table, in turn, can include indices into yet other data tables. For example, next hop entry 204*a* includes an index into encapsulation table 206 and an index into egress table 208. Encapsulation table 206 may include information on whether and how to encapsulate the packet for transmission. Egress table 208 may include information relating to the transmission of the packet; e.g., port identifier.

Figure 2B:
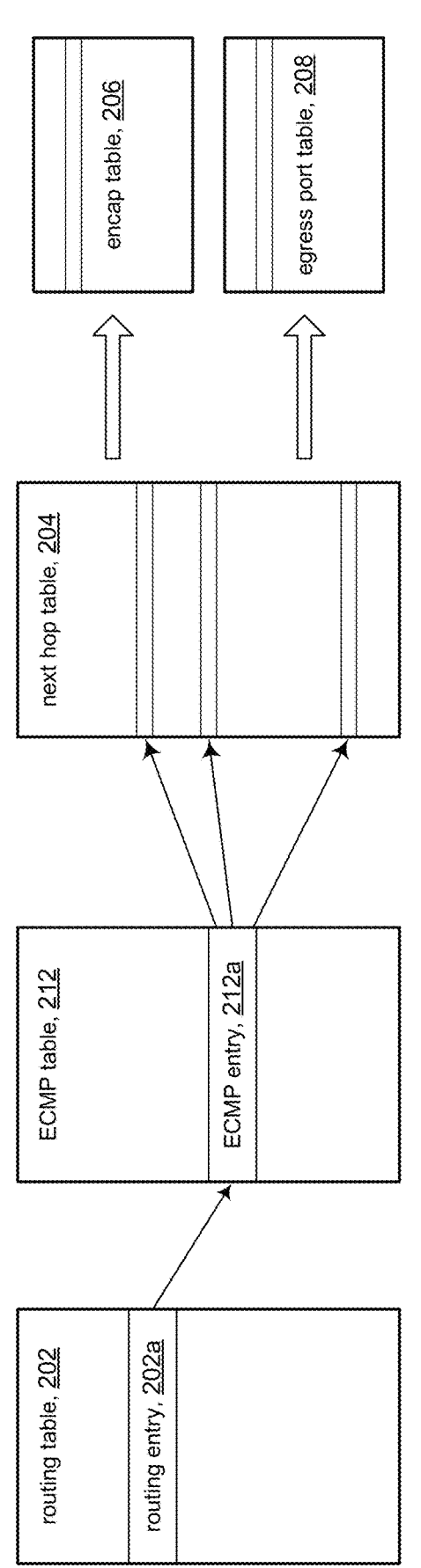

FIG. 2B shows another illustrative example of data tables that can comprise FIB 116. In this example, entries in router table 202 point to an ECMP (equal cost multipath) table 212. Each entry (e.g., entry 212*a*) in the ECMP table can point to multiple next hop entries in the next hop table 204, and so on.

Figure 3A:
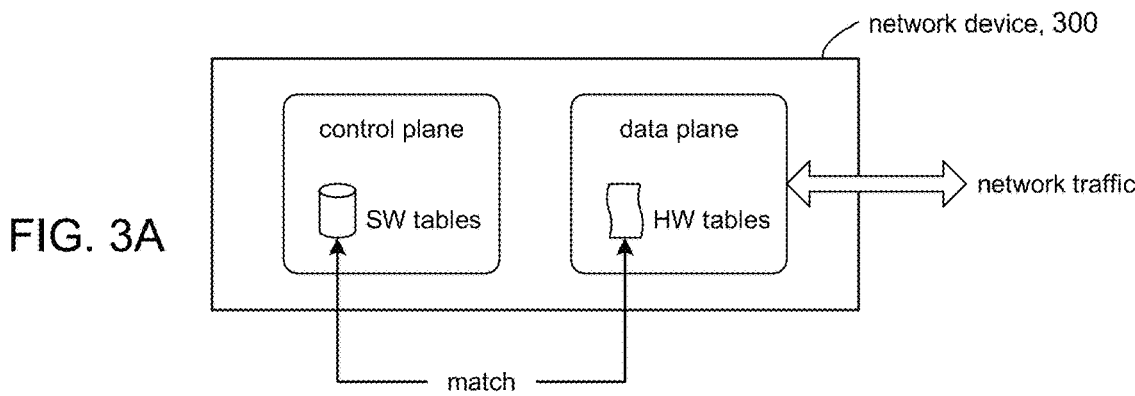
FIGS. 3A, 3B, 3C, 3D represent stages of processing in a network device in accordance with the present disclosure.
Figure 3B:
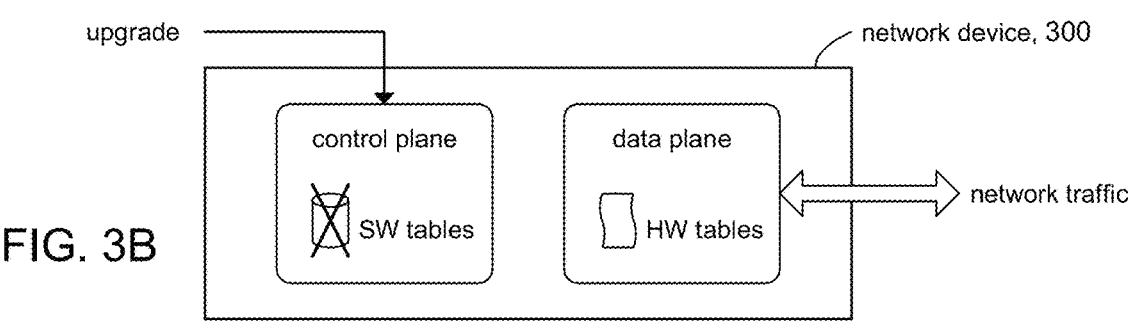
Figure 3C:
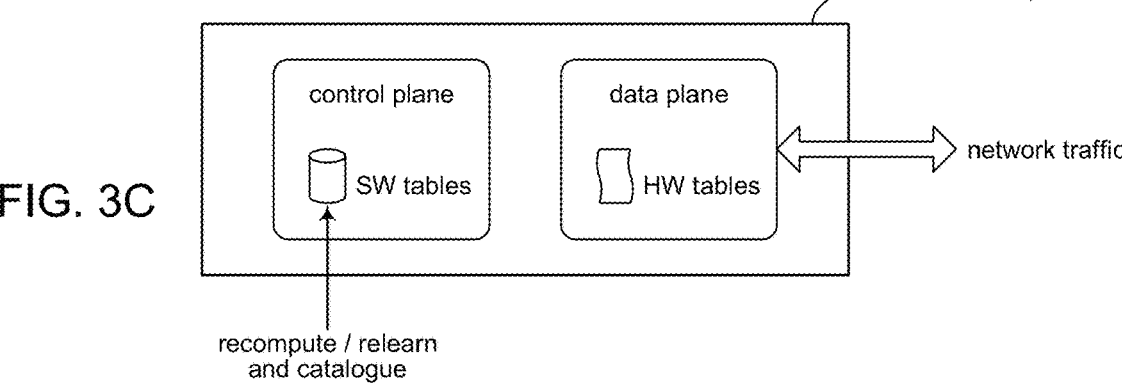
Figure 3D:
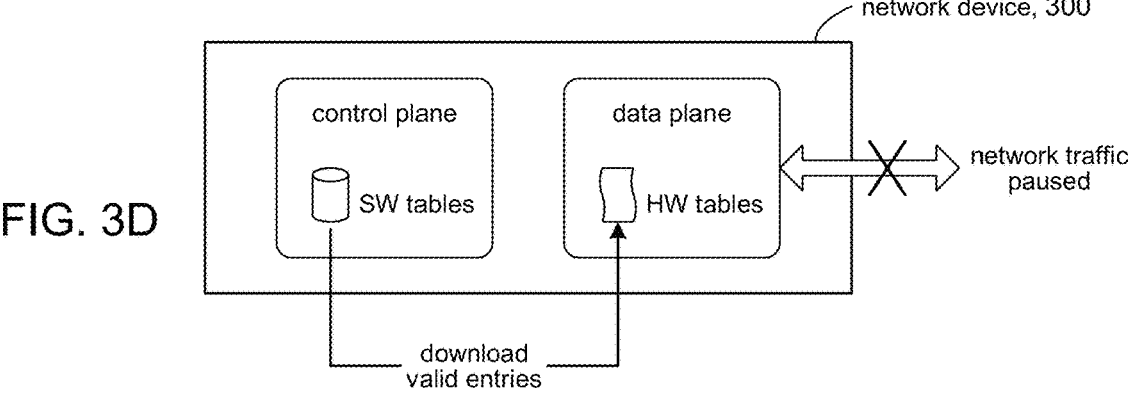

Referring to FIGS. 3A-3D, as noted above, when software in the control plane of network device 300 is upgraded, the upgrade can involve deleting the data state of the control plane. FIG. 3A shows an initial configuration where forwarding information in the software tables in the control plane match forwarding information in the hardware tables in the data plane. As part of the upgrade process, forwarding information stored in the software tables may be cleared (FIG. 3B); e.g. all entries are initialized to some value (0x0000, 0xFFFF, etc.) to indicate the entry is unused. The forwarding information can be recomputed (e.g., via ARP (address resolution protocol) processing, STP (spanning tree protocol) learning, and so on) and "catalogued" in accordance with the present disclosure (FIG. 3C). The control plane can quiesce traffic processing in the data plane to download valid entries in the recomputed forwarding information (FIG. 3D). Subsequent to the download, the control plane can resume traffic processing in the data plane (FIG. 3A).

Network traffic through the network device is disabled until the software tables are downloaded to the hardware. During the course of recomputing and/or relearning forwarding information for a software table, entries in the software table that store valid information at one point in time and may subsequently become invalid later on. For purposes of the present disclosure, an entry in a software table can be deemed to be "valid" (or used) if the entry points to, or contains an index to, a valid entry in another software table. Conversely, an entry can be deemed to be "invalid" (or unused, empty) if the entry does not point to a valid entry in another software table. In some embodiments, for example, an entry may contain some value (e.g., 0x0000 or 0xFFFF) that designates the entry as being invalid.

The process of recomputing/relearning forwarding information can result in sparsely populated software tables that contain valid (used) entries and invalid (unused, empty) entries. For example, in a given table with 100K entries, it may be that only 50K of the entries are valid. The valid entries may be sparsely dispersed throughout the table; the table may have groups of valid entries and groups of invalid entries. Downloading the entirety of sparsely populated tables can unnecessarily delay the resumption of traffic forwarding by the network device. The delay can be unnecessarily disruptive when larger software tables having large numbers of unused entries are involved.

Figure 4:
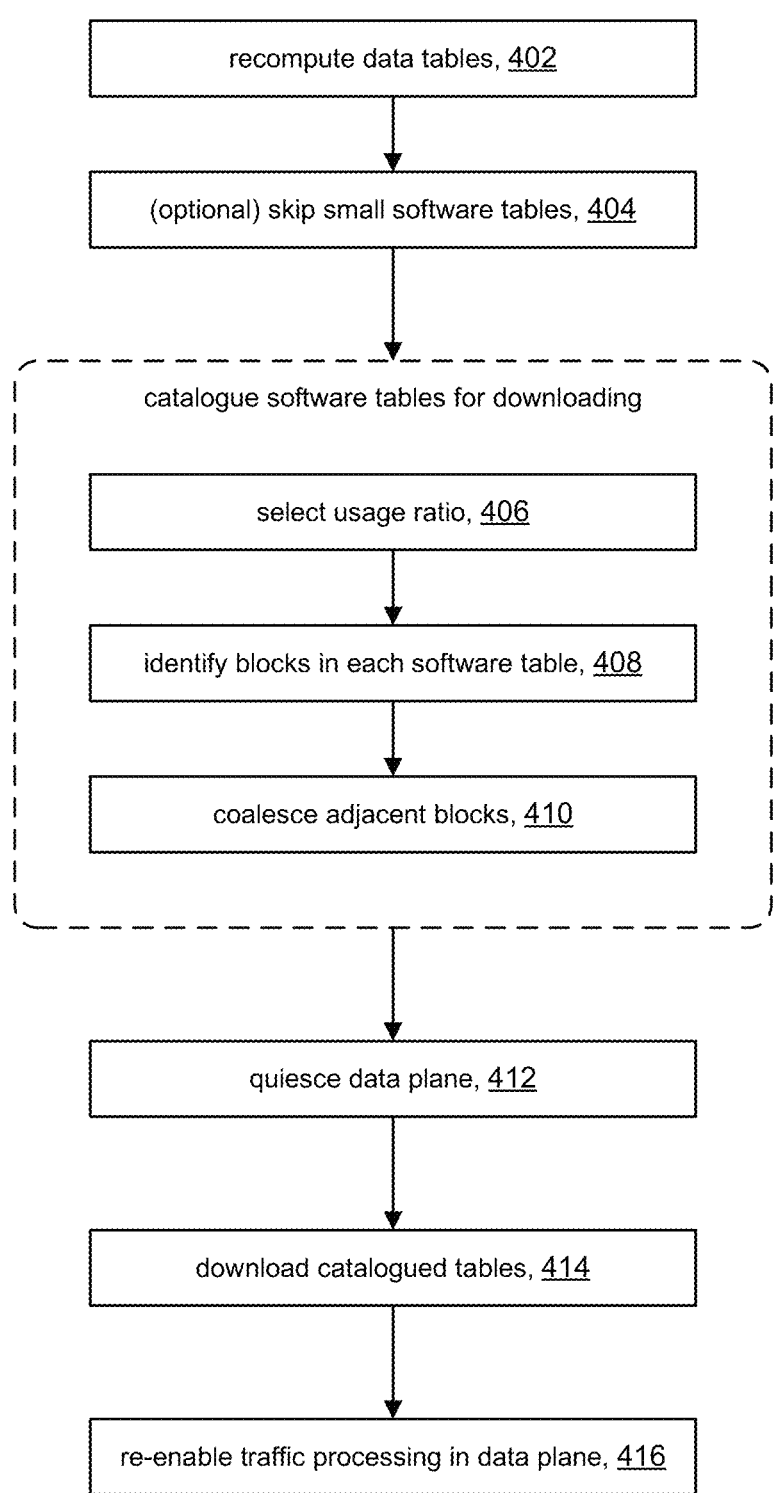
FIG. 4 shows operations in accordance with an embodiment of the present disclosure.
Figure 5:
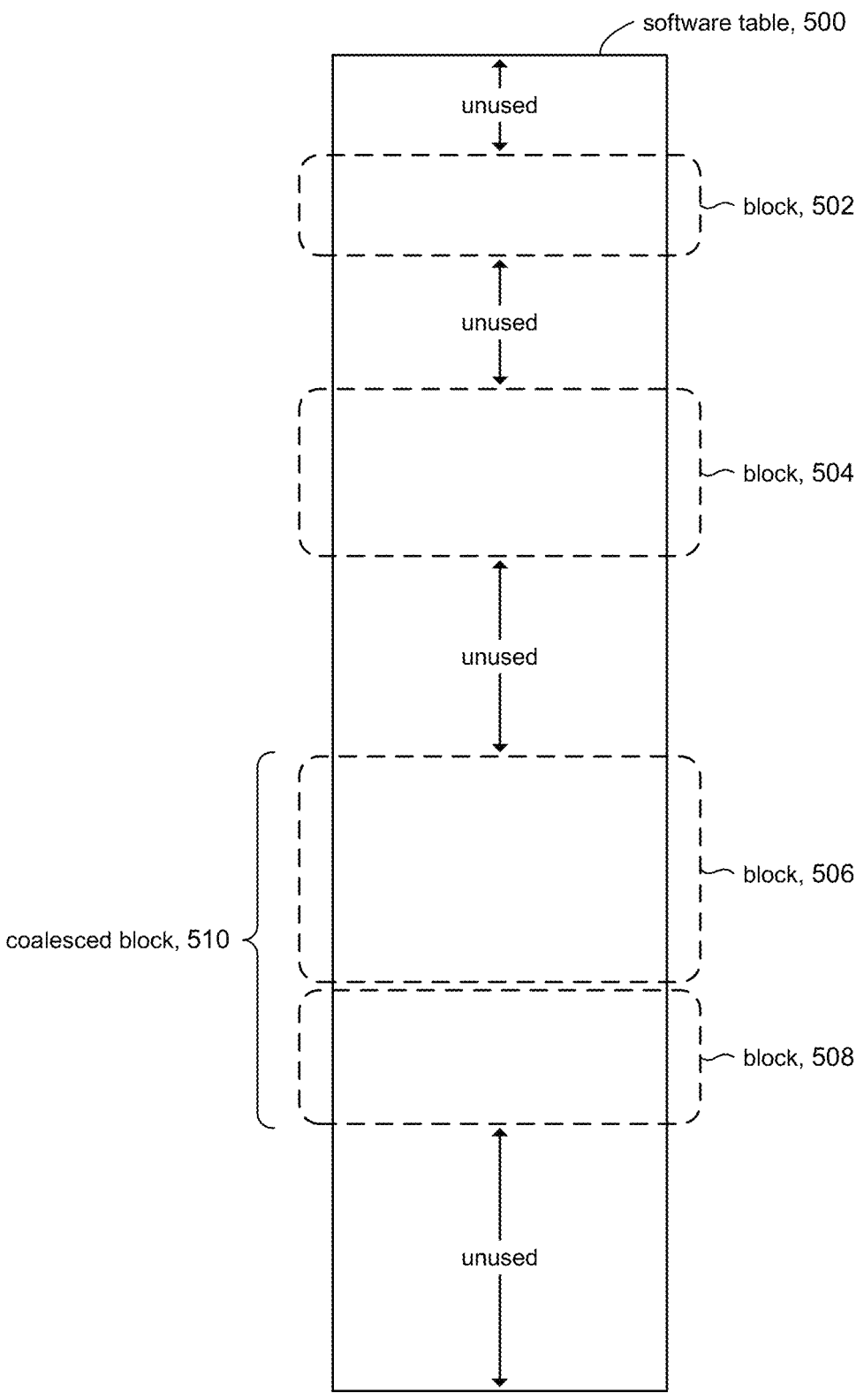
FIG. 5 illustrates identifying blocks in a data table in accordance with the present disclosure.
Figure 6:
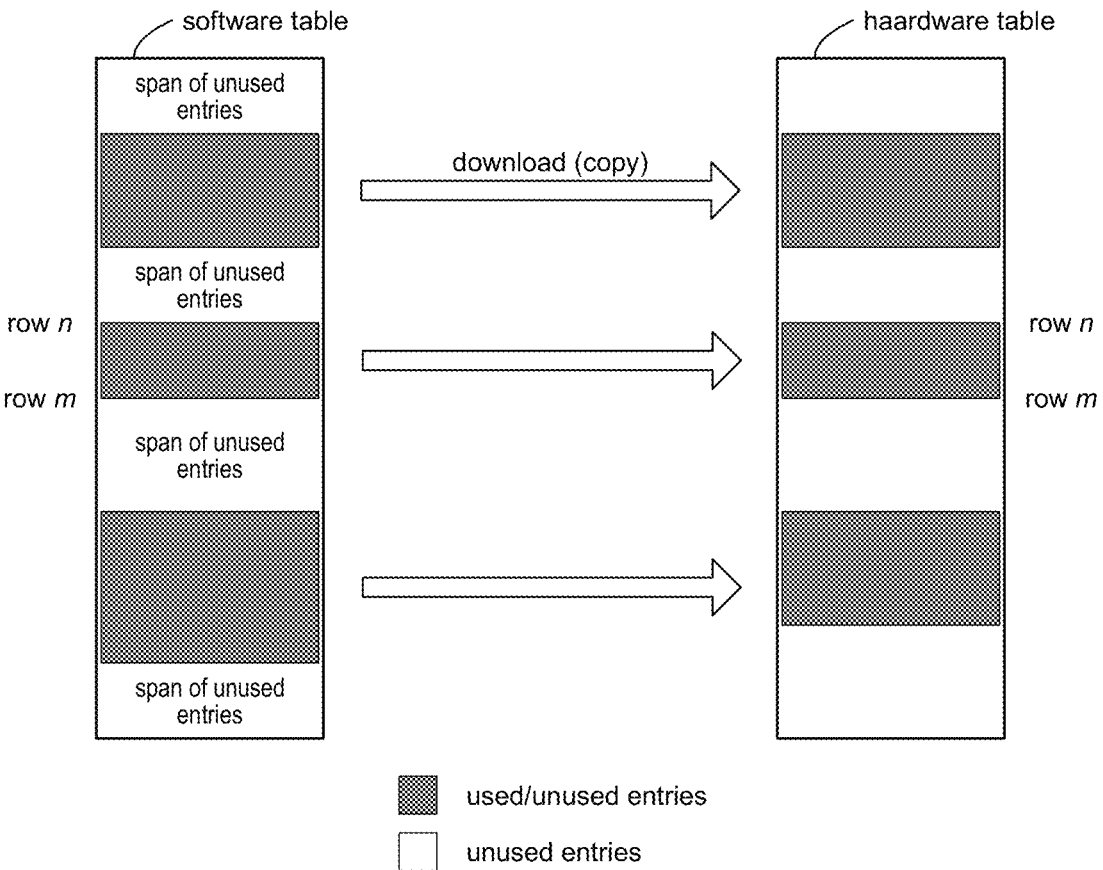
FIG. 6 illustrates downloading a software table to a corresponding hardware table in accordance with the present disclosure.

Referring to FIGS. 4, 5, and 6, the discussion will now turn to a high-level description of processing in a network device (e.g., 100, FIG. 1) for downloading forwarding information from software tables in the control plane to hardware tables in the data plane in accordance with the present disclosure. FIG. 5 provides an illustrative example to facilitate the description of the process.

In some embodiments, the network device can include one or more digital processing units, which when operated, can cause the network device to perform processing in accordance with FIG. 4. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU. Digital processing units can include specialized processors in the data plane of the network device, such as digital signal processors, field programmable gate arrays, application specific integrated circuits, and the like, that operate by way of executing computer program code or by way of logic circuits being configured for specific operations.

At operation 402, the control plane in the network device can recompute the forwarding information in its software tables. For example, the data state may be erased when software in the control plane is updated. When the control plane reboots after the upgrade, forwarding information (such as route tables, MAC (media access control) tables, and the like) can be recomputed/relearned. When recomputation of the software tables is deemed to have completed, the control plane can process ("catalogue") one or more software tables in accordance with the present disclosure.

At operation 404, the control plane can omit cataloguing software tables that have a small number of entries. In some embodiments, every software table can be catalogued in accordance with the present disclosure regardless of the number of entries in the table. In other embodiments, the cataloguing of smaller software tables can be omitted; the time savings for processing smaller tables may be deemed insignificant. Accordingly, in some embodiments, a size threshold (e.g., 256 entries, 512 entries, etc.) can be used to designate a "small" table. Software tables that are smaller in size (fewer total entries) than the size threshold can be deemed to be small and not catalogued for downloading.

The discussion will now continue with a description for cataloguing and downloading software tables in accordance with various embodiments.

At operation 406, the control plane can access a usage ratio. The usage ratio is a value that can be provided by a user (e.g., network administrator) and stored in the network device. In some embodiments, a single usage ratio can be associated with each software table. In other embodiments, each software table can be associated with its own usage ratio. As will be explained in more detail below, the usage ratio is used to identify blocks in a software table to download.

At operation 408, the control plane can identify blocks of consecutive entries in each software table based on the usage ratio associated with that software table. As used herein, a "block" refers to a consecutive row of entries in a software table. For example, row n to row n+m−1 refers to a block of m consecutive rows.

"Usage ratio" refers to the ratio of used entries to unused entries in a block of consecutive entries in a software table For example, a block of entries having a usage ratio of r means that the ratio of used entries in the block to unused entries is r or greater. Stated differently, a block of entries having a usage ratio of r means that the block contains at least r times more used entries than unused entries. The usage ratio refers to the ratio of used to unused entries in a block, and does not dictate the size (number of entries) of the block. As an example, a block having 100 entries and a usage ratio of 90, would comprise 90 or more used entries and 10 or less unused entries. Similarly, a block with a usage ratio of 90 having 500 entries would comprise 450 or more used entries and 50 or less unused entries.

Referring for a moment to FIG. 5, an illustrative example of a software table 500 is shown. The figure represents several blocks 502, 504, 506, 508 of consecutive entries identified in software table 500 that satisfy the usage ratio associated with the software table. Each block 502-508 contains used and unused entries where the ratio of used to unused entries is equal to or greater than the usage ratio associated with the software table. FIG. 5 further illustrates that, although each block 502-508 satisfies the usage ratio, the blocks can be of different sizes. FIG. 5 further shows spans of unused entries in software table 500 that contain invalid data or are otherwise unused.

At operation 410, the control plane can coalesce adjacent blocks. If a software table has two adjacent blocks, the blocks may be coalesced to form a single block (if the single block satisfies the usage ratio) in order to reduce the number of blocks to download to further reduce traffic outage time. If the usage ratio is not satisfied, then the two blocks can remain separate. FIG. 5, for example, shows that blocks 506, 508 can be coalesced to form a larger block 510.

At operation 412, the control plane can stop (quiesce) traffic forwarding in the data plane in preparation for downloading the catalogued software tables. In some embodiments, for example, the control plane can write data to certain registers in the network device that signal the data plane to stop traffic.

At operation 414, the control plane can download the blocks identified among the software tables to corresponding locations in corresponding hardware tables in the data plane. For example, a block comprising rows n through m in a software table can be downloaded (copied) to rows n through m in the corresponding hardware table. In accordance with the present disclosure, spans of unused portions of a software table are not downloaded, thus reducing the download time and duration of traffic outage. FIG. 6 provides a diagrammatic representation of this operation. On the other hand, unused entries contained in the downloaded blocks are copied to the hardware tables. However, those entries will not interfere with traffic forwarding because the entries are not referenced by any of the hardware tables.

Although the identified blocks of entries include unused entries, setting the usage ratio to a sufficiently large value can reduce the number of unused entries that are downloaded. Depending on the nature of the forwarding information that is relearned and the recomputation process, large spans of unused entries in a software table may result. Under those circumstances, processing in accordance with embodiments of the present disclosure can realize significant reduction in traffic outage times by not downloading the large spans of unused entries.

At operation 416, the control plane can re-enable traffic forwarding in the data plane, for example, by writing appropriate data to registers in the network device that signal the data plane to resume traffic processing.

Download Differences

The discussion will now turn to a description of downloading software tables based on differences with the corresponding hardware tables to reduce traffic outage time.

Figure 7:
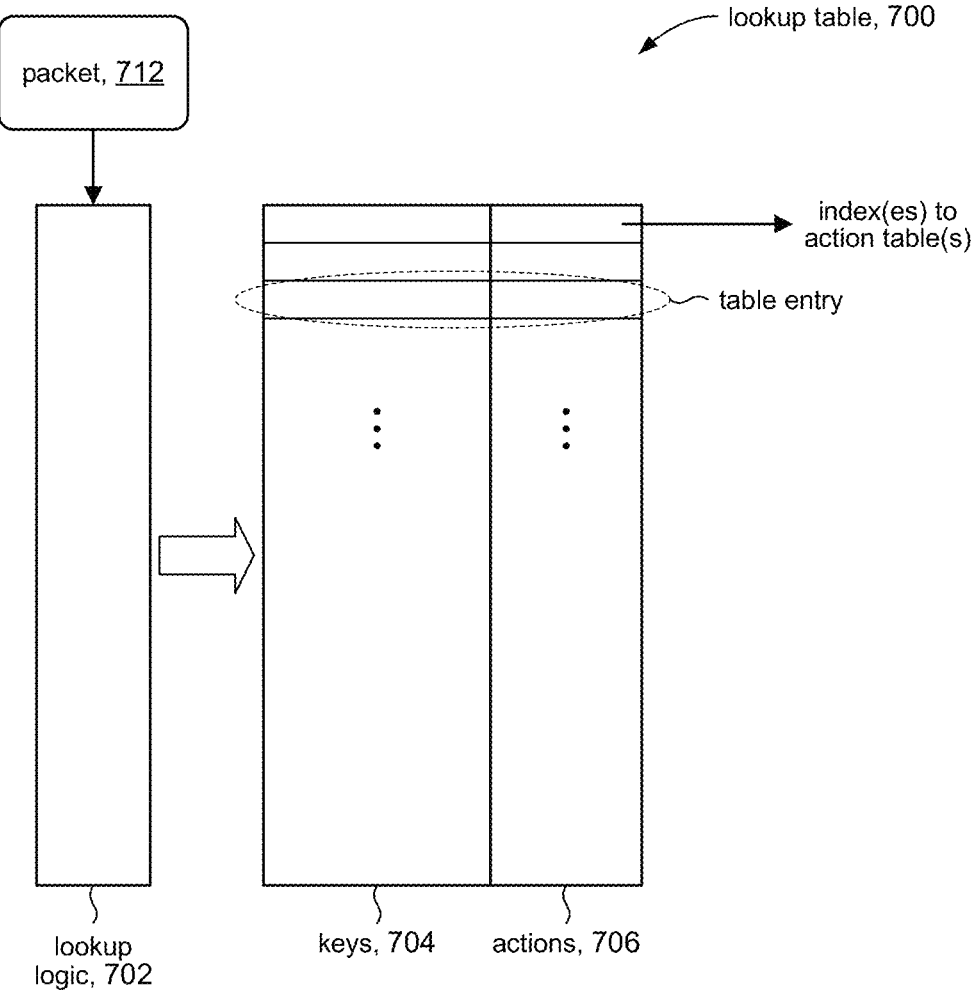
FIG. 7 depicts an illustrative example of a lookup table that can be processed in accordance with the present disclosure.

FIG. 7 shows a lookup table comprising entries that include lookup keys. Entries can be identified using content contained in a packet as the lookup key; e.g., SIP (source IP address), DIP (destination IP), SMAC (source MAC address), protocol, portions of the payload, etc. Examples of lookup tables include TCAM (ternary content addressable memory) and hash tables, which are schematically represented by lookup table 700.

Lookup tables can store packet filters generated from ACLs (access control lists). ACLs are known. Briefly, an ACL is a collection of rules that identify various packets for certain actions, such as deny, permit, log, redirect, police, etc. Each rule comprises one or more match conditions based on packet contents (e.g., SIP=10.0.0.0/24, DIP=128.0.0.0/24, etc.) and one or more actions. A packet that matches a rule is subject to the action(s) associated with the matching rule. ACL rules, which are expressed in human readable form, are "compiled" to produce corresponding filters that are expressed in a form (e.g., binary) that is suitable for execution by the network device.

Lookup table 700 can include lookup logic 702 to identify an entry in the lookup table. Each table entry can comprise a key field 704 and an action field 706. Data in a packet 712 can be provided to the lookup logic 702 to identify one or more table entries. For example, in the case of a hash table type of lookup table, lookup logic 702 can compute a hash value that serves as an index (key) into the lookup table to retrieve a table entry. In the case of a TCAM type lookup table, lookup logic 702 and key fields 704 can be integrated to provide lookups based on the content of the packet 712. Content-based memories (also referred to as associative memories) are known. The action field in a retrieved entry can include one or more indices to action tables that indicate one or more action(s) to be performed on the packet, for instance packet forwarding in accordance with a routing table (e.g., FIG. 2A).

Figure 8A:
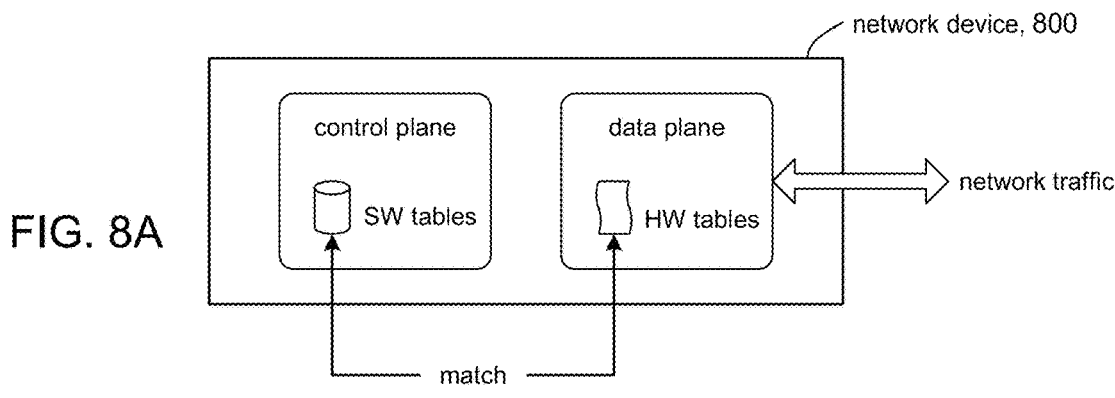
FIGS. 8A, 8B, 8C, 8D represent stages of processing in a network device in accordance with the present disclosure.
Figure 8B:
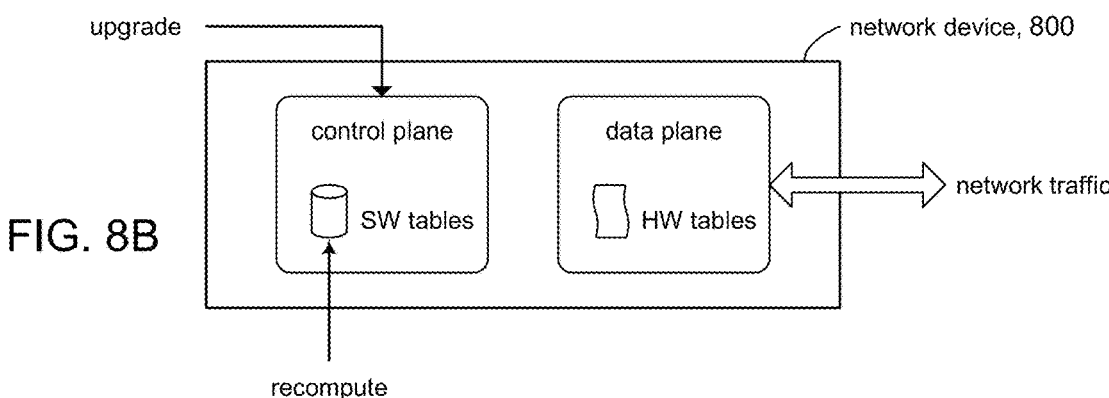
Figure 8C:
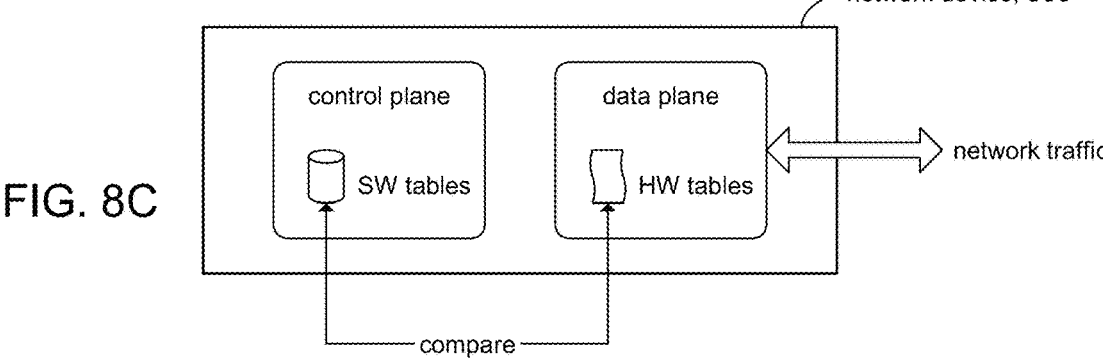
Figure 8D:
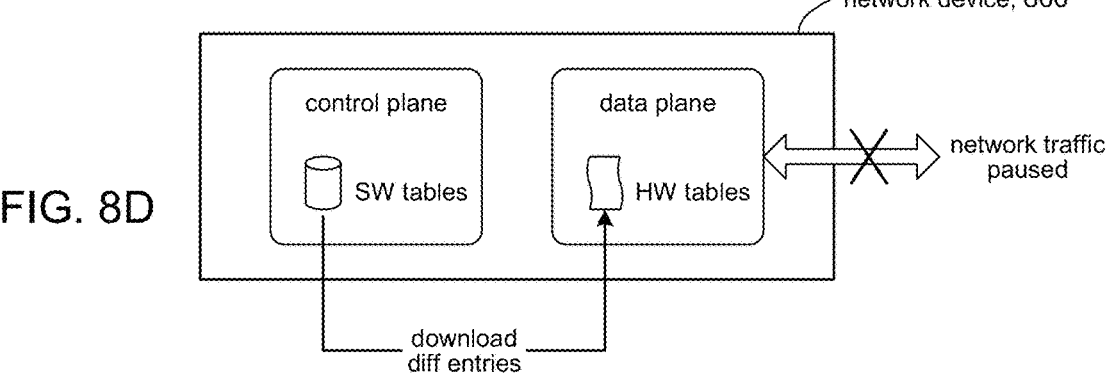

Referring to FIGS. 8A-8D, in accordance with some embodiments, when software in the control plane of network device 800 is upgraded, the upgrade can involve recomputing one or more software tables (e.g., lookup tables) in the control plane. FIG. 8A shows an initial configuration where the software tables in the control plane match the corresponding hardware tables in the data plane. As part of the upgrade process, the software tables may be recomputed (FIG. 8B); e.g., a user may download new ACLs to the network device and new filters recomputed. The control plane can identify differences between the software tables and the hardware tables (FIG. 8C). The control plane can quiesce traffic processing in the data plane to download the differences to the hardware tables (FIG. 8D). Subsequent to the download, the control plane can resume traffic processing in the data plane (FIG. 8A).

Figure 9:
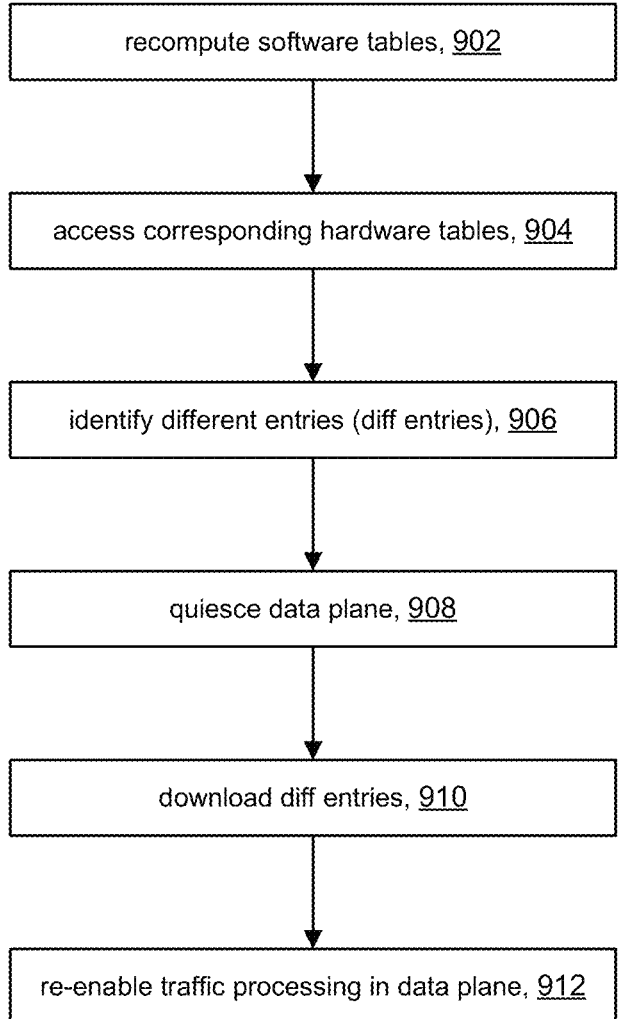
FIG. 9 shows operations in accordance with an embodiment of the present disclosure.

Referring to FIG. 9, the discussion will now turn to a high-level description of processing in a network device (e.g., 100, FIG. 1) for downloading software tables in the control plane to corresponding hardware tables in the data plane in accordance with the present disclosure. In some embodiments, the network device can include one or more digital processing units, which when operated, can cause the network device to perform processing in accordance with FIG. 9. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU. Digital processing units can include specialized processors in the data plane of the network device, such as digital signal processors, field programmable gate arrays, application specific integrated circuits, and the like, that operate by way of executing computer program code or by way of logic circuits being configured for specific operations.

At operation 902, the control plane can recompute one or more of its software tables. For example, new ACL rules may be downloaded as part of updating the control plane. When the control plane reboots after the upgrade, filters can be generated from the ACL rules and stored in one or more lookup tables in the control plane.

At operation 904, the control plane can access the hardware tables that correspond to the recomputed software tables. In some embodiments, for example, the control plane can upload the hardware tables into the memory (e.g., RAM) of the control plane. In other embodiments, entries in the hardware tables can be accessed in situ directly from the data plane without uploading the hardware entries into the control plane.

At operation 906, the control plane can identify entries in a recomputed software table that differ from corresponding entries in the corresponding hardware table. In some embodiments, the comparison can be performed sequentially entry-by-entry; each entry x in the software table being compared with the corresponding entry x in the corresponding hardware table. Entries in the software table that differ (diff entries) from corresponding entries in the hardware table can be marked or otherwise identified for download. The comparison can be a bitwise comparison between the bits that comprise an entry in the software table and the bits that comprise the corresponding entry in the hardware table.

At operation 908, the control plane can halt (quiesce) traffic forwarding in the data plane in preparation for downloading the identified diff entries. In some embodiments, for example, the control plane can write data to certain registers in the network device that signal the data plane to stop traffic.

At operation 910, the control plane can download the diff entries identified among the software tables to corresponding entries in the corresponding hardware tables. Non-diff entries are not downloaded; entries in the hardware tables that are the same as in the recomputed software tables remain untouched. Traffic interruption is reduced by downloading only diff entries among the software tables, instead of all entries.

At operation 912, the control plane can re-enable traffic forwarding in the data plane, for example, by writing appropriate data to registers in the network device that signal the data plane to resume traffic processing.

Figure 10:
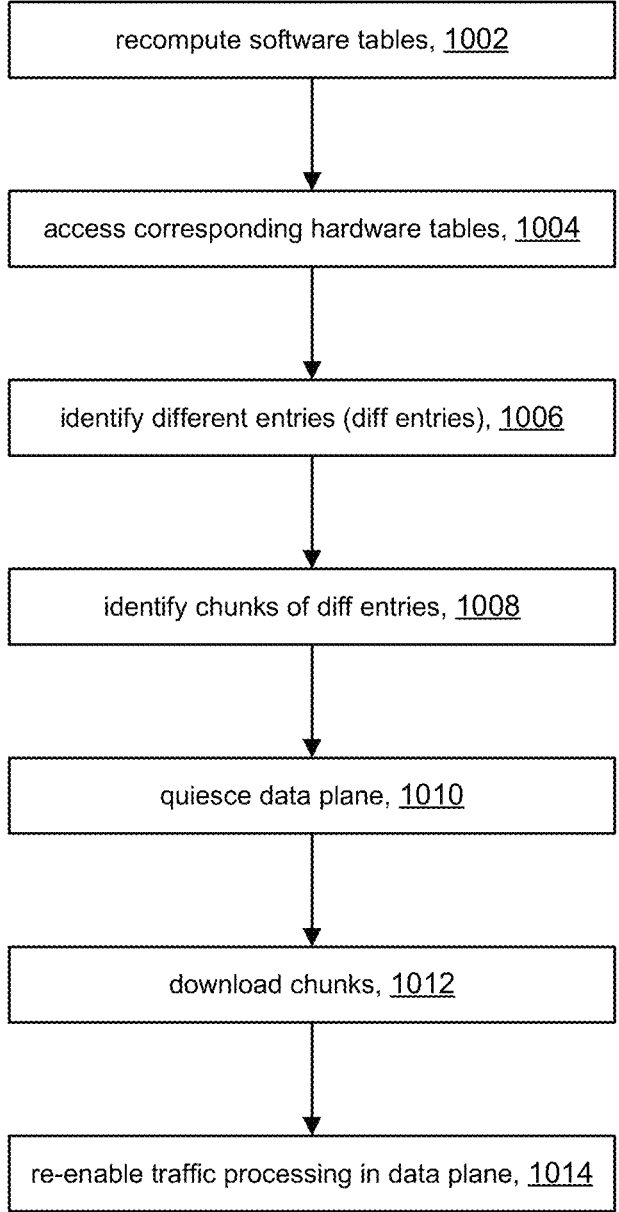
FIG. 10 shows operations in accordance with an embodiment of the present disclosure.

Referring to FIG. 10 the discussion will now turn to a high-level description of processing in a network device (e.g., 100, FIG. 1) for downloading diff entries to the hardware in units of chunks. In some embodiments, the network device can include one or more digital processing units, which when operated, can cause the network device to perform processing in accordance with FIG. 10. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU. Digital processing units can include specialized processors in the data plane of the network device, such as digital signal processors, field programmable gate arrays, application specific integrated circuits, and the like, that operate by way of executing computer program code or by way of logic circuits being configured for specific operations.

At operation 1002, the control plane can recompute one or more of its software tables. For example, new ACL rules may be downloaded into the control plane as part of updating the control plane; e.g., by a network administrator, an automated process, etc. When the control plane reboots after the upgrade, filters can be generated from the ACL rules and stored in one or more software lookup tables in the control plane.

At operation 1004, the control plane can access the hardware tables that correspond to the recomputed software tables. In some embodiments, for example, the control plane can upload the hardware tables into the memory (e.g., RAM) of the control plane. In other embodiments, entries in the hardware tables can be accessed in situ directly from the data plane without uploading the hardware entries into the control plane.

At operation 1006, the control plane can identify entries in a given recomputed software table that differ from corresponding entries in the corresponding hardware table. In some embodiments, the comparison can be performed sequentially entry-by-entry; each entry x in the software table being compared with the corresponding entry x in the corresponding hardware table. Entries in the software table that differ (diff entries) from corresponding entries in the hardware table can be marked or otherwise identified for download. The comparison can be a bitwise comparison between the bits that comprise an entry in the software table and the bits that comprise the corresponding entry in the hardware table.

At operation 1008, the control plane can identify chunks of identified diff entries in the given recomputed software table. In some embodiments, chunks can be identified according to the following:

A chunk comprises a consecutive run of entries in the software table. In accordance with some embodiments, a consecutive run refers to a run of adjacent rows of entries.

A chunk includes both diff (changed) entries and non-diff (unchanged) entries.

The first and last entries in a chunk are diff entries.

Figure 11:
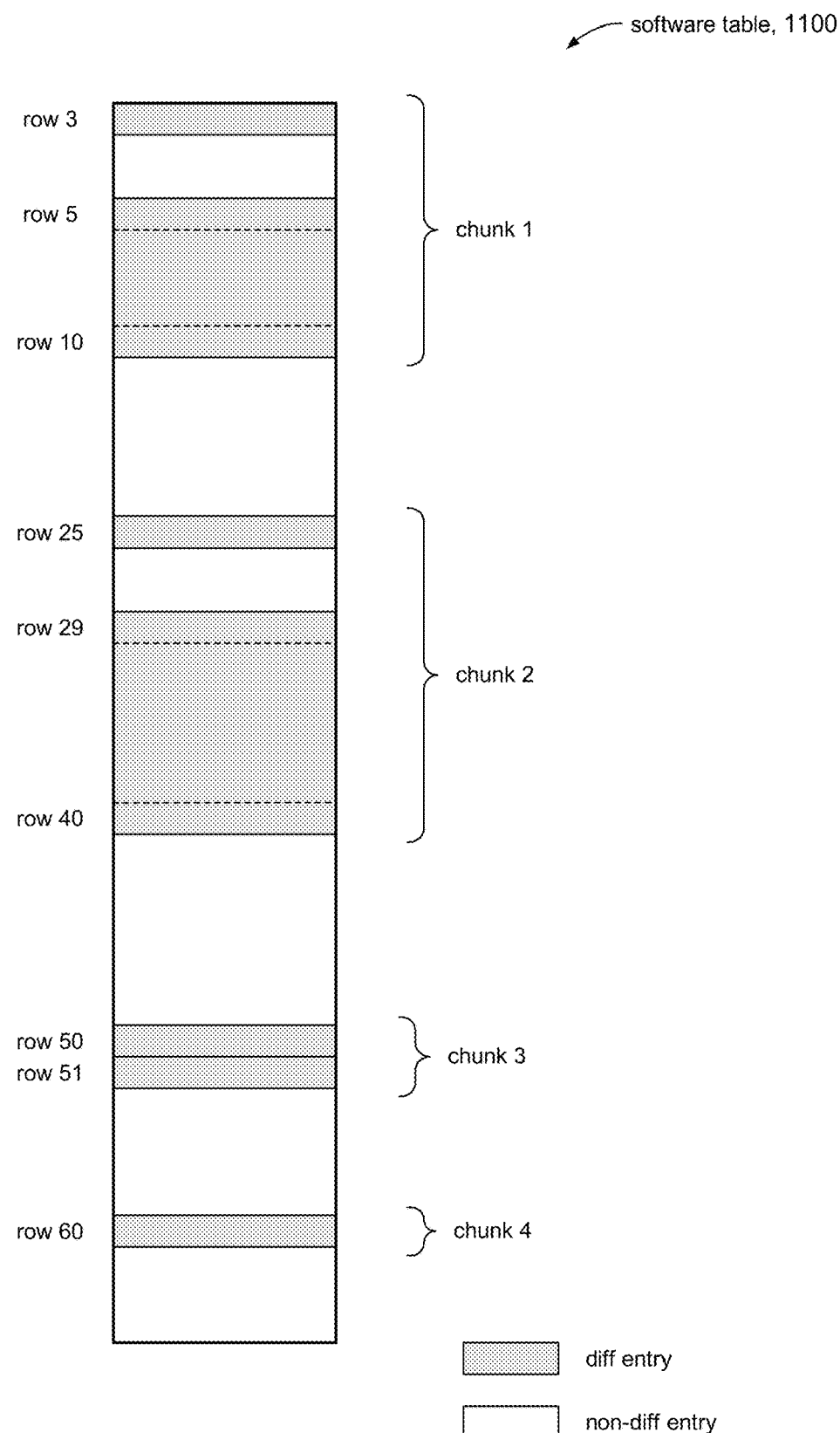
FIG. 11 shows an example for identifying chunks.

Two chunks are separated by a minimum inter-chunk distance, min_chunk_distance; two chunks are separated by a distance greater than or equal to min_chunk_distance. In some embodiments, "distance" can be measured as the number of non-diff entries between any two chunks. In other embodiments, distance can refer to the row number difference between the last diff entry in one chunk and the first diff entry in the next chunk. Stated differently, this minimum distance requirement implies that any two diff entries within a chunk is less than min_chunk_distance. Illustrative examples of this aspect of the present disclosure are shown in FIG. 11.

Merely for explanatory purposes, for example, the software table can be scanned in a first pass to identify consecutive runs of diff entries. This pass identifies groups of consecutive runs of entries that comprise only diff entries. Referring to FIG. 11, for example, groups of diff entries in software table 1100 include row 3 (run of 1 entry), rows 5-10, row 25, rows 28-40, rows 50-51, and row 60.

A second pass can then be performed to identify chunks in accordance with the above constraints by coalescing the above-identified groups of diff entries. Referring again to FIG. 11, suppose for example, we set min_chunk_distance to 4 and let "distance" refer to the difference between the row numbers of two entries (as described above):

chunk 1—The difference between row 3 and row 5 is less than the minimum distance of "4" and so row 3 to row 10 can be coalesced into a chunk.

The difference between row 10 and row 25 is greater than the minimum distance of "4" and so row 25 cannot be coalesced into chunk 1.

chunk 2—The difference between row 25 and row 29 is equal to the minimum distance of "4" and so row 25 to row 40 can be coalesced into a chunk.

The difference between row 40 and row 50 exceeds the minimum distance of "4" and so row 50 cannot be coalesced into chunk 2.

chunk 3—The difference between row 50 and row 51 is less than the minimum distance of "4" and so row 50 and row 51 can be coalesced into a chunk.

The difference between row 51 and row 60 is greater than the minimum distance of "4" and so row 50 cannot be coalesced into chunk 3.

chunk 4—Row 60 is the last diff entry in software table 1100 and cannot be coalesced with chunk 3 (the row difference between row 51 and row 60 exceeds the minimum distance).

It can be shown that the same chunk allocation in FIG. 11 can be obtained if we set min_chunk_distance to 3 and let "distance" refer to the number of non-diff entries between any two diff entries.

At operation 1010, the control plane can halt (quiesce) traffic forwarding in the data plane in preparation for downloading the identified chunks. In some embodiments, for example, the control plane can write data to certain registers in the network device that signal the data plane to stop traffic.

At operation 1012, the control plane can download the chunks of diff entries identified among the recomputed software tables to corresponding entries in the corresponding hardware table(s). In accordance with the present disclosure, spans of non-diff entries are not downloaded, thus reducing the download time and duration of traffic outage. On the other hand, non-diff entries contained in the downloaded chunks are copied to the hardware tables. However, those entries are the same entries as existed in the hardware tables as before the download and so will not result in disruptions to traffic processing.

At operation 1014, the control plane can re-enable traffic forwarding in the data plane, for example, by writing appropriate data to registers in the network device that signal the data plane to resume traffic processing.

Following is an illustrative example of pseudo-code for computing chunks in accordance with some embodiments:

```
// initialize chunk list container to empty
for each entry e in table:
    if e is diff-entry:
        // entry "e" in software is different from hardware
        if chunk list container is empty:
            newC = allocate new chunk
            newC.start = e.index
```

-continued

```
        newC.end = e.index
        add newC to chunk list container
    else:
        curC = get last chunk from list container
        if e.index < curC.end + MIN_CHUNK_DISTANCE:
            curC.end = e.index
        else:
            newC = allocate new chunk
            newC.start = e.index
            newC.end = e.index
            add newC to last chunk of list container
```

Features described above as well as those claimed below may be combined in various ways without departing from the scope hereof. The following examples illustrate some possible, non-limiting combinations:

(A1) A method for a system update in a network device, the method comprising: preparing at least one packet processing table in a control plane of the network device for download to a corresponding packet processing table in a data plane of the network device, the preparing being concurrently performed while processing network traffic in the data plane of the network device, the preparing including: updating one or more entries in the packet processing table; identifying changed entries and unchanged entries in the updated packet processing table by comparing entries in the updated packet processing table with corresponding entries in a corresponding packet processing table in the data plane of the network device; and identifying chunks of entries in the updated packet processing table comprising consecutive sequences of entries that contain at least one changed entry. The method further including: disabling network traffic processing and forwarding in the data plane; downloading only the identified chunks of entries in the updated packet processing table to corresponding entries in the corresponding packet processing table in the data plane of the network device; and re-enabling network traffic processing and forwarding in the data plane.

(A2) For the method denoted as (A1), the packet processing table in the control plane and in the data plane are lookup tables comprising ACL rules (access control list).

(A3) For the method denoted as any of (A1) through (A2), updating an entry in the packet processing table includes one of adding the entry, deleting the entry, modifying contents of the entry.

(A4) For the method denoted as any of (A1) through (A3), unchanged entries within the identified chunks are downloaded, wherein unchanged entries between the identified chunks are not downloaded.

(A5) For the method denoted as any of (A1) through (A4), a chunk of entries includes changed and unchanged entries, wherein changed entries in the chunk are separated by no more than a predetermined number of unchanged entries.

(A6) For the method denoted as any of (A1) through (A5), chunks of entries are separated by a predetermined minimum number of consecutive unchanged entries.

(A7) The method denoted as any of (A1) through (A6), further comprising coalescing identified chunks of entries that are adjacent to each other.

(B1) A method in a network device comprising: updating one or more data tables in the control plane concurrently with processing of network traffic in a data plane of the network device; identifying chunks of entries in the updated data tables that contain one or more changed entries that differ from corresponding entries in corresponding data tables in the data plane; and updating the corresponding data tables in the data plane. The updating including: disabling the processing of network traffic in the data plane; downloading only the identified chunks of entries in the updated data tables to corresponding entries in the one or more corresponding data tables in the data plane; and re-enabling the processing of network traffic in the data plane.

(B2) For the method denoted as (B1), unchanged entries that are not included in any of the identified chunks are not downloaded.

(B3) For the method denoted as any of (B1) through (B2), a ratio of changed entries to unchanged entries in a chunk is equal to or greater than a predetermined ratio.

(B4) For the method denoted as any of (B1) through (B3), the number of entries varies from one chunk to another chunk.

(B5) The method denoted as any of (B1) through (B4), further comprising coalescing identified chunks of entries that are adjacent to each other.

(B6) For the method denoted as any of (B1) through (B5), updating the one or more data tables in the control plane is performed as part of a software update of the control plane.

(C1) A network device comprising: one or more computer processors; and a computer-readable storage medium comprising instructions. The instructions for controlling the one or more computer processors to: update at least one lookup table stored in a control plane of the network device; identify consecutive runs of entries in the updated lookup table that comprise at least one entry of a first type; and download the identified consecutive runs of entries in the updated lookup table to corresponding entries in a corresponding lookup table in a data plane of the network device, wherein entries of a second type in the updated lookup table that are not in any of the consecutive runs of entries are not downloaded.

(C2) For the network device denoted as (C1), the lookup table in the control plane and in the data plane comprise ACL rules (access control list).

(C3) For the network device denoted as any of (C1) through (C2), an entry of the first type in the updated lookup table is an entry that is different from a corresponding entry in the corresponding lookup table in the data plane, wherein an entry of the second type in the updated lookup table is an entry that is the same as a corresponding entry in the corresponding lookup table in the data plane.

(C4) For the network device denoted as any of (C1) through (C3), for a given consecutive run of entries, the number of entries of the first type equals or exceeds the number of entries of the second type by a predetermined factor.

(C5) For the network device denoted as any of (C1) through (C4), for a given consecutive run of entries, any two entries of the first type are separated at most by a predetermined number of entries of the second type.

(C6) For the network device denoted as any of (C1) through (C5), the computer-readable storage medium further includes instructions for controlling the one or more computer processors to coalesce consecutive runs of entries that are adjacent to each other.

(C7) For the network device denoted as any of (C1) through (C6), updating the at least one lookup table in the control plane is performed concurrently with processing of network traffic in the data plane, wherein the computer-readable storage medium further includes instructions for controlling the one or more computer processors to: disable the processing of network traffic in the data plane prior to downloading the identified consecutive runs of entries to the data plane; and re-enable the processing of network traffic in the data plane subsequent to downloading the identified consecutive runs of entries to the data plane.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for a system update in a network device, the method comprising:

preparing at least one packet processing table in a control plane of the network device for download to a corresponding packet processing table in a data plane of the network device, the preparing being concurrently performed while processing network traffic in the data plane of the network device, the preparing including:

updating one or more entries in the packet processing table;

identifying changed entries and unchanged entries in the updated packet processing table by comparing entries in the updated packet processing table with corresponding entries in a corresponding packet processing table in the data plane of the network device; and identifying chunks of entries in the updated packet processing table comprising consecutive sequences of entries that contain at least one changed entry;

disabling network traffic processing and forwarding in the data plane;

downloading only the identified chunks of entries in the updated packet processing table to corresponding entries in the corresponding packet processing table in the data plane of the network device; and re-enabling network traffic processing and forwarding in the data plane.

2. The method of claim 1, wherein the packet processing table in the control plane and in the data plane are lookup tables comprising ACL rules (access control list).

3. The method of claim 1, wherein updating an entry in the packet processing table includes one of adding the entry, deleting the entry, modifying contents of the entry.

4. The method of claim 1, wherein unchanged entries within the identified chunks are downloaded, wherein unchanged entries between the identified chunks are not downloaded.

5. The method of claim 1, wherein a chunk of entries includes changed and unchanged entries, wherein changed entries in the chunk are separated by no more than a predetermined number of unchanged entries.

6. The method of claim 1, wherein chunks of entries are separated by a predetermined minimum number of consecutive unchanged entries.

7. The method of claim 1, further comprising coalescing identified chunks of entries that are adjacent to each other.

8. A method in a network device, the method comprising:

updating one or more data tables in a control plane concurrently with processing of network traffic in a data plane of the network device;

identifying chunks of entries in the updated data tables that contain one or more changed entries that differ from corresponding entries in corresponding data tables in the data plane; and updating the corresponding data tables in the data plane, including:

disabling the processing of network traffic in the data plane;

downloading only the identified chunks of entries in the updated data tables to corresponding entries in the one or more corresponding data tables in the data plane; and re-enabling the processing of network traffic in the data plane.

9. The method of claim 8, wherein unchanged entries that are not included in any of the identified chunks are not downloaded.

10. The method of claim 8, wherein a ratio of changed entries to unchanged entries in a chunk is equal to or greater than a predetermined ratio.

11. The method of claim 8, wherein a number of changed entries in a chunk varies from one chunk to another chunk.

12. The method of claim 8, further comprising coalescing identified chunks of entries that are adjacent to each other.

13. The method of claim 8, wherein updating the one or more data tables in the control plane is performed as part of a software update of the control plane.

14. A network device comprising:

one or more computer processors; and a computer-readable storage medium comprising instructions for controlling the one or more computer processors to:

update at least one lookup table stored in a control plane of the network device;

identify consecutive runs of entries in the updated lookup table that comprise at least one entry of a first type; and download the identified consecutive runs of entries in the updated lookup table to corresponding entries in a corresponding lookup table in a data plane of the network device, wherein entries of a second type in the updated lookup table that are not in any of the consecutive runs of entries are not downloaded.

15. The network device of claim 14, wherein the lookup table in the control plane and in the data plane comprise ACL rules (access control list).

16. The network device of claim 14, wherein an entry of the first type in the updated lookup table is an entry that is different from a corresponding entry in the corresponding lookup table in the data plane, wherein an entry of the second type in the updated lookup table is an entry that is the same as a corresponding entry in the corresponding lookup table in the data plane.

17. The network device of claim 14, wherein for a given consecutive run of entries, a number of entries of the first type equals or exceeds a number of entries of the second type by a predetermined factor.

18. The network device of claim 14, wherein for a given consecutive run of entries, any two entries of the first type are separated at most by a predetermined number of entries of the second type.

19. The network device of claim 14, wherein the computer-readable storage medium further includes instructions for controlling the one or more computer processors to coalesce consecutive runs of entries that are adjacent to each other.

20. The network device of claim 14, wherein updating the at least one lookup table in the control plane is performed concurrently with processing of network traffic in the data plane, wherein the computer-readable storage medium further includes instructions for controlling the one or more computer processors to:

disable the processing of network traffic in the data plane prior to downloading the identified consecutive runs of entries to the data plane; and re-enable the processing of network traffic in the data plane subsequent to downloading the identified consecutive runs of entries to the data plane.

* * * * *